US011774364B2

(12) United States Patent
Notingher et al.

(10) Patent No.: US 11,774,364 B2
(45) Date of Patent: Oct. 3, 2023

(54) RAMAN SPECTROSCOPY METHOD AND APPARATUS

(71) Applicant: THE UNIVERSITY OF NOTTINGHAM, Nottingham (GB)

(72) Inventors: Ioan Notingher, Nottingham (GB); Christopher Corden, Nottingham (GB); Dustin Shipp, Nottingham (GB)

(73) Assignee: THE UNIVERSITY OF NOTTINGHAM, Nottingham (GB)

( * ) Notice: Subject to any disclaimer, the term of this patent is extended or adjusted under 35 U.S.C. 154(b) by 289 days.

(21) Appl. No.: 17/276,596

(22) PCT Filed: Sep. 17, 2019

(86) PCT No.: PCT/GB2019/052618
§ 371 (c)(1),
(2) Date: Mar. 16, 2021

(87) PCT Pub. No.: WO2020/058702
PCT Pub. Date: Mar. 26, 2020

(65) Prior Publication Data
US 2022/0042916 A1 Feb. 10, 2022

(30) Foreign Application Priority Data

Sep. 18, 2018 (GB) .................................... 1815207

(51) Int. Cl.
*G01N 21/65* (2006.01)
*G02B 21/02* (2006.01)
(Continued)

(52) U.S. Cl.
CPC ............ *G01N 21/65* (2013.01); *G02B 21/02* (2013.01); *G02B 21/16* (2013.01); *G02B 21/26* (2013.01);
(Continued)

(58) Field of Classification Search
CPC .................................. G01J 3/44; G02B 21/26
See application file for complete search history.

(56) References Cited

U.S. PATENT DOCUMENTS

2004/0068193 A1   4/2004   Barnes et al.
2008/0174777 A1   7/2008   Carron
(Continued)

FOREIGN PATENT DOCUMENTS

DE   102010005723 A1     7/2011
FR       3042043 A1  *  4/2017   ........... G01N 21/636
(Continued)

OTHER PUBLICATIONS

Ordana Blacksberg, "Miniaturized time-resolved Raman spectrometer for planetary science based on a fast single photon avalanche diode detector array", Jan. 22, 2016 (Year: 2016).*
(Continued)

*Primary Examiner* — Maurice C Smith
(74) *Attorney, Agent, or Firm* — David D. Brush

(57) ABSTRACT

Apparatus and methods for acquiring a Raman spectral map of a sample including a material species. The apparatus includes: a pulsed illumination source providing pulsed illumination radiation for exciting the sample and producing scattered radiation; a microscope objective focusing the pulsed illumination radiation onto a region of the sample corresponding to a data point of the map, and collecting emitted radiation from the region; a translation stage translating the sample relative to the microscope objective in at least two directions; a spectral filter spectrally filtering the emitted radiation collected by the objective to obtain a filtered portion of radiation corresponding to a characteristic Raman spectral feature of the material species; a detector receiving the filtered portion and providing output electrical pulses indicative thereof; and readout electronics applying a time gate to the output electrical pulses to distinguish
(Continued)

detection events corresponding to the Raman scattered radiation from events associated with photoluminescence.

27 Claims, 13 Drawing Sheets

(51) Int. Cl.
    *G02B 21/16*     (2006.01)
    *G02B 21/26*     (2006.01)
    *G02B 21/36*     (2006.01)

(52) U.S. Cl.
    CPC ..... *G02B 21/365* (2013.01); *G01N 2201/021* (2013.01); *G01N 2201/0634* (2013.01); *G01N 2201/0635* (2013.01); *G01N 2201/0636* (2013.01); *G01N 2201/06113* (2013.01)

(56) References Cited

U.S. PATENT DOCUMENTS

| | | |
|---|---|---|
| 2010/0309464 A1 | 12/2010 | Treado et al. |
| 2013/0321799 A1 | 12/2013 | Day et al. |
| 2013/0342835 A1 | 12/2013 | Blacksberg |
| 2018/0031482 A1 | 2/2018 | Jagiella et al. |
| 2018/0252649 A1* | 9/2018 | Härkönen .............. G01N 21/65 |

FOREIGN PATENT DOCUMENTS

| | | |
|---|---|---|
| WO | 2007112099 A2 | 10/2007 |
| WO | 2013180922 A1 | 12/2013 |

OTHER PUBLICATIONS

Ikka Nissinen, "On the effects of the time gate position and width on the signal-to-noise ratio for detection of Raman spectrum in a time-gated CMOS single-photon avalanche diode based sensor", 2016 (Year: 2016).*

K. Ehrlich, "Fibre optic time-resolved spectroscopy using CMOS-SPAD arrays", 2017 (Year: 2017).*

International Search Report dated Dec. 18, 2019 for corresponding International Application No. PCT/GB2019/052618, dated Sep. 17, 2019.

Written Opinion of the International Searching Authority dated Dec. 18, 2019 for corresponding International Application No. PCT/GB2019/052618, filed Sep. 17, 2019.

GB Search and Exam Report dated Mar. 18, 2019 for corresponding GB Application No. 1815207.4, filed Sep. 18, 2018.

* cited by examiner

RAMAN SPECTROSCOPY METHOD AND APPARATUS

CROSS-REFERENCE TO RELATED APPLICATIONS

This Application is a Section 371 National Stage Application of International Application No. PCT/GB2019/052618, filed Sep. 17, 2019, the content of which is incorporated herein by reference in its entirety, and published as WO 2020/058702 on Mar. 26, 2020, in English.

FIELD OF THE INVENTION

The invention relates to Raman spectroscopy, and in particular to an apparatus and a method for the acquisition of a Raman spectral map of a sample.

BACKGROUND

Raman micro-spectroscopy is a powerful tool for mapping molecular properties of samples with diffraction limited spatial resolution. However, a major source of noise for many samples arises from laser-excited fluorescence emission, which is a concurrent phenomenon with Raman scattering. The fluorescence emission leads to a background signal that can be, in some cases, orders of magnitude higher than the Raman signal itself. If the relatively weak Raman signal is of the same order (or smaller) as the shot-noise caused by the fluorescence signal (i.e. square root of fluorescence intensity), then the Raman signal is lost.

Many techniques have been proposed over the years to counteract the effects of fluorescence emission. While computational techniques cannot eliminate the fundamental shot-noise caused by the fluorescence photons, selecting an excitation laser wavelength in the 700-830 nm near-infrared region can reduce the likelihood of fluorescence excitation for many samples in order to facilitate reasonably short integration times (0.1-1 s) required in hyperspectral Raman mapping. Nevertheless, this approach for fluorescence suppression may still not be sufficient for a range of systems such as pigmented samples (e.g. pigmented biological samples, art and archeology artefacts, geology, etc.).

Operating in the time-domain, while still maintaining near-infrared excitation using pico-second pulsed lasers, has proven to be one of the most effective methods for dealing with highly fluorescing samples in Raman spectroscopy. Using this approach, the Raman and fluorescence photons can be separated in the time-domain, thus preventing the latter from ever being measured and eliminating the photon shot-noise associated with fluorescence emission.

Existing time-gating Raman spectroscopy techniques use either direct optical gating or time correlated single photon counting. Optical gating techniques typically use an optical Kerr Gate or an iCCD camera and achieve high fluorescence suppression and high-spectral resolution, but can require long acquisition times. While optical Kerr gating offers a high temporal resolution and choice of excitation wavelength, it requires a complex system that includes powerful pulsed laser systems to activate the Kerr medium, restricting its implementation to specialist laboratories. Furthermore, iCCDs suffer from noise created by intensifiers, which results in a limited signal-to-noise ratio.

Time-correlated single photon counting techniques use a high temporal resolution detection system to record the time of arrival of each photon, and a scanning monochromator is used to record a Raman spectrum. However, Raman mapping requires a large number of measurements (e.g. 10,000 spectra for a 100×100 image), making mapping impractical—and thus these methods are not used for acquiring Raman maps. Multichannel single photon avalanche diode (SPAD) arrays could in principle somewhat reduce the acquisition times. However, multichannel SPAD devices have a low fill factor (i.e. worse signal-to-noise ratio) and the temporal resolution of the combined array is typically poorer than that of a single detector. Further, multichannel SPAD devices are very expensive.

It is an object of the invention to provide an apparatus and a method for acquiring a Raman spectral map which overcome, or improve upon, some or all of the limitations set out above.

SUMMARY OF THE INVENTION

According to a first aspect of the invention there is provided an apparatus for acquiring a Raman spectral map of a sample comprising a material species, the Raman spectral map consisting of an array of data points corresponding to respective regions of the sample, the apparatus comprising:

a pulsed illumination source arranged to provide pulsed illumination radiation for exciting the sample and producing scattered radiation;

a microscope objective arranged to focus the pulsed illumination radiation onto a region of the sample corresponding to a data point of the Raman spectral map, and further arranged to collect emitted radiation from said region;

a translation stage arranged to translate the sample relative to the microscope objective in at least two directions;

a spectral filter arranged to spectrally filter the emitted radiation collected by the microscope objective to obtain a filtered portion of the emitted radiation corresponding to one or more characteristic Raman spectral features of the material species;

a detector arranged to receive said filtered portion of the emitted radiation and to provide output electrical pulses indicative thereof; and readout electronics connected to the detector and operable to apply a time gate to said output electrical pulses to distinguish detection events corresponding to Raman scattered radiation associated with the material species from detection events associated with photoluminescence.

The filtered portion of the emitted radiation may correspond to two or more characteristic Raman peaks of the material species. Advantageously, because Raman scattered photons associated with two or more Raman peaks of the material species are made available to the detector, the overall intensity of Raman scattered light available for detection is increased, which means that sufficient detection events can be recorded for each region of the Raman spectral map in a shorter period of time compared to detection of a single Raman peak. This reduces the overall time required to acquire the time gated Raman spectral map.

The filtered portion may cover at least the full width half maximum, FWHM, of a Raman peak of the material species. The inventors appreciate that different Raman peaks may have different bandwidths and it is desirable to tune the spectral filter to the width of a peak to optimize the intensity of Raman scattered light available for detection whilst minimizing transmission of background light to the detector—thereby optimizing the overall signal to noise ratio.

The spectral filter may comprise a dispersive element and a spatial light modulator, SLM. The SLM may be a digital micro mirror device, DMD, or a liquid crystal SLM. The dispersive element may be a diffraction grating or a prism. Advantageously, SLMs such as DMDs or liquid crystal SLMs are well suited to programmable selection of particular spatial regions of a spatially dispersed spectrum. Therefore, desired spectral components can be selected whilst rejecting undesired components.

The apparatus may further comprise recombination optics arranged to spatially recombine different wavelengths of the filtered portion of the emitted radiation before coupling into the detector. Advantageously, this means that the filtered portion of the emitted radiation can be focused down to a smaller spatial spot size which enables the use of a smaller detector active area whilst still collecting all of the available light. This is advantageous because detector bandwidth increases as the detector active area is reduced such that the recombination optics allow for a faster detector to be employed—thereby resulting in a reduction in overall acquisition time for the Raman spectral map. The recombination optics may comprise a pair of prisms or a pair of diffraction gratings.

The apparatus may further comprise a long pass optical filter in the path of the emitted radiation between the microscope objective and the spectral filter. Advantageously the long pass filter blocks unwanted scattered light, such as elastically scattered light, thereby improving the signal to noise ratio.

The detector may be a single pixel detector, such as a single pixel single photon avalanche diode (SPAD). Single pixel detectors have a better fill factor than array detectors which results in better signal to noise ratio, and a better temporal resolution, providing better rejection of the fluorescence photons from the Raman photons. Single pixel detectors are also cheaper than array detectors.

The pulsed illumination source may be a pulsed laser arranged to produce pulses with a wavelength in the range 500 nm to 1000 nm. The pulse duration may be in the range 1 ps to 100 ps. The pulse energy may be in the range 1 nJ to 20 nJ. The repetition rate may be in the range 1 MHz to 100 MHz.

The readout electronics may comprise a time to digital converter configured to compare the arrival time of the output electrical pulses with a synchronization pulse derived from the pulsed illumination source.

The apparatus may further comprise a computer connected to the readout electronics and to the translation stage, the computer comprising a non-volatile memory storing a program containing instructions arranged to control the apparatus to acquire a Raman spectral map.

The spectral filter may be arranged to spectrally filter the emitted radiation collected by the microscope objective to obtain a first filtered portion of the emitted radiation corresponding to one or more characteristic Raman spectral features of a first material species of the sample, and a second filtered portion of the emitted radiation corresponding to one or more characteristic Raman spectral features of a second material species of the sample which is distinct from the first material species. The first and second filtered portions may have different polarizations and/or spatial modes. A first detector may be arranged to receive the first filtered portion of the emitted radiation and to provide first output electrical pulses indicative thereof and a second detector may be arranged to receive the second filtered portion of the emitted radiation and to provide second output electrical pulses indicative thereof. The readout electronics may be connected to the first and second detectors and may be operable to apply time gates to said first and second output electrical pulses to distinguish detection events corresponding to Raman scattered radiation associated with the first and second material species respectively from detection events associated with photoluminescence. Advantageously, multiple detectors can be employed to simultaneously monitor different filtered portions of scattered light associated with different material species. In this manner a multi-species, time-gated Raman spectral map can be acquired for the different species in parallel—thereby reducing overall acquisition time compared to using a single detector.

According to a second aspect of the invention there is provided a method of acquiring a Raman spectral map of a sample comprising a material species, the Raman spectral map consisting of an array of data points corresponding to respective regions of the sample, the method comprising:

producing pulsed illumination radiation for exciting the sample and producing scattered radiation;

focusing the pulsed illumination radiation onto a region of the sample corresponding to a data point of the Raman spectral map, and collecting emitted radiation from said region;

spectrally filtering the collected emitted radiation to obtain a filtered portion of the emitted radiation corresponding to one or more characteristic Raman spectral features of the material species;

detecting the filtered portion of the emitted radiation to provide output electrical pulses indicative thereof;

time gating the output electrical pulses to distinguish detection events corresponding to Raman scattered radiation associated with the material species from detection events associated with photoluminescence; and repeating the above steps for each region of the sample corresponding to a data point of the Raman spectral map.

The filtered portion of the emitted radiation may correspond to two or more characteristic Raman peaks of the material species.

The filtered portion of the emitted radiation may cover at least the full width half maximum, FWHM, of a Raman peak of the material species.

The step of spectrally filtering may comprise spatially separating different wavelengths of the collected emitted radiation using a dispersive element and selecting one or more wavelengths using a spatial light modulator, SLM.

The method may further comprise spatially recombining different wavelengths of the filtered portion before detecting the filtered portion.

The method may further comprise applying a long pass optical filter to the emitted radiation before said step of spectrally filtering.

The step of time gating may comprise comparing the arrival time of the output electrical pulses with a synchronization pulse corresponding to the pulsed illumination radiation.

The step of detecting may be performed with a single-pixel detector. The single pixel detector may be a single photon-avalanche diode, SPAD.

The step of spectrally filtering the emitted radiation may comprise obtaining a first filtered portion of the emitted radiation corresponding to one or more characteristic Raman spectral features of a first material species of the sample and a second filtered portion of the emitted radiation corresponding to one or more characteristic Raman spectral features of a second material species of the sample which is distinct from the first material species. The first and second filtered portions may have different polarizations or spatial modes. The first and second filtered portions of the emitted radiation may be separately detected (e.g. simultaneously by different detectors) to provide output electrical pulses indicative thereof. The output electrical pulses may be time gated to distinguish detection events corresponding to Raman scattered radiation associated with the first and second material species from detection events associated with photoluminescence.

The method may comprise generating a spectral map of the sample, the spectral map being in the form of an image comprising a plurality of pixels, in which each pixel in the image has a colour corresponding to a detected material species in the sample. The image may comprise greater than around 10,000 pixels. In some examples the sample may be a tissue sample, in which the colour of each pixel corresponds to a detected type of tissue in the sample. In other examples the sample may comprise a mixture of pigments, and the colour of each pixel may correspond to a detected pigment in the sample.

The output electrical pulses may be time gated to less than around 100 ps from each pulse of illumination radiation, and optionally between 1 ps and around 100 ps or between around 50 ps and around 100 ps.

BRIEF DESCRIPTION OF THE DRAWINGS

Embodiments will now be described by way of example only, with reference to the accompanying drawings, in which.

DETAILED DESCRIPTION OF ILLUSTRATIVE EMBODIMENTS

Figure 1:
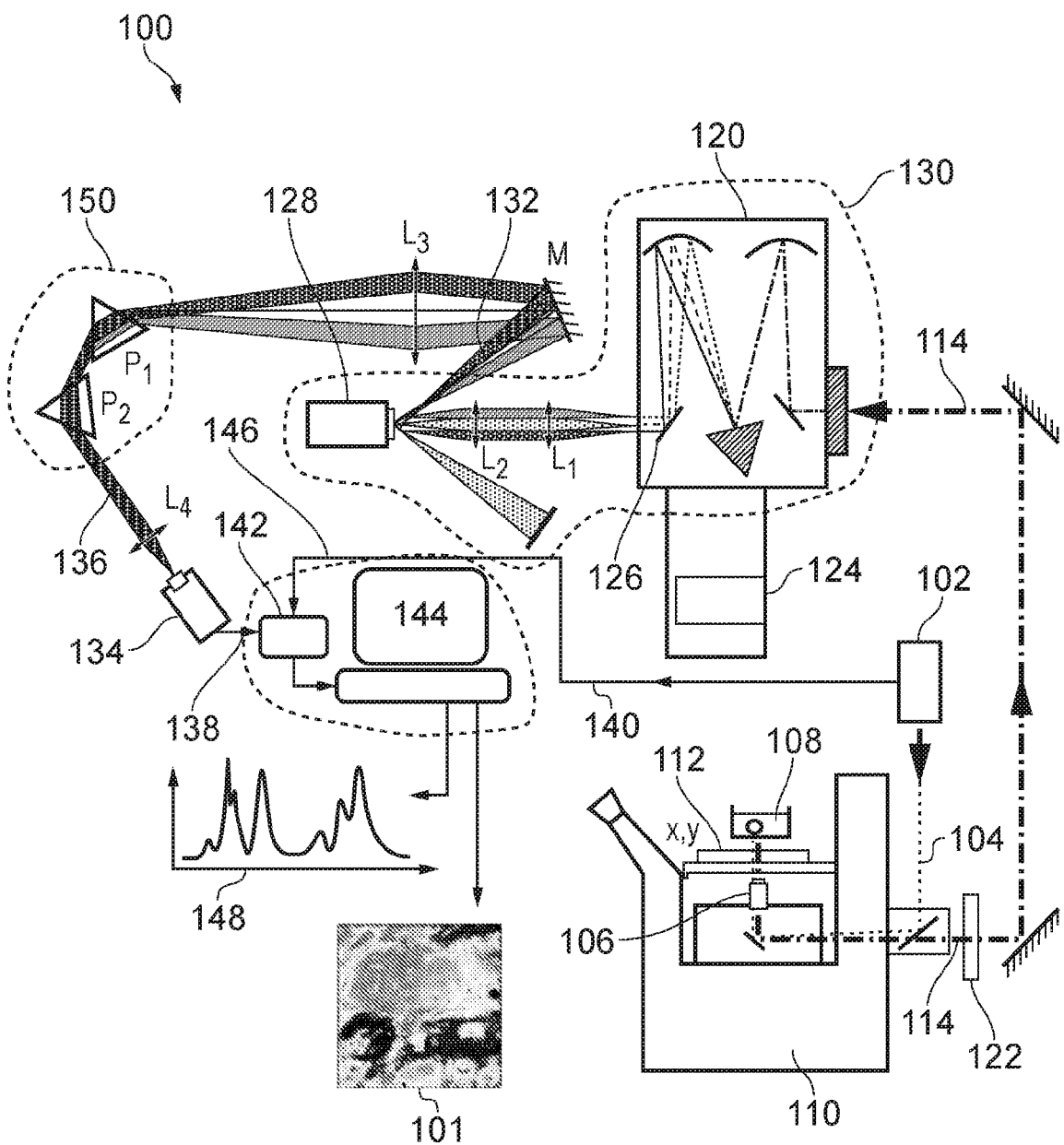
FIG. 1 is a schematic illustration of an apparatus for acquiring data to produce a time-gated Raman spectral map in accordance with the present disclosure.

An apparatus 100 for acquiring a Raman spectral map 101 of a sample 108 according to an embodiment of the invention will be described with reference to FIG. 1. A Raman spectral map 101 generally consists of an array of data points corresponding to respective regions of the sample 108. For example, the Raman spectral map 101 could be a 40×40 array of data which corresponds to a 120 µm×120 µm region of a sample scanned with a 3 µm step size in two orthogonal dimensions, forming an image having 1,600 pixels. A pulsed illumination source 102 is provided in the form of a 35 ps pulsed laser with 775 nm wavelength. In one example the laser is a Katana 775 which provides 65 mW average power, 5 nJ pulse energy, at a 10 MHz repetition rate. The pulsed illumination radiation 104 from the laser 102 is focused using a microscope objective 106 onto a sample 108 comprising one or more material species, which in this example are Stilbene (1,2-diphenylethene) and Tylenol (acetaminophen). The microscope objective 106 forms part of a larger microscope arrangement 110 which includes a translation stage 112 arranged to move the sample 108 relative to the microscope objective 106 in two orthogonal directions (i.e. x and y) in order to scan across the sample 108 to build up the Raman spectral map 101. In one example the microscope arrangement 110 is a Nikon confocal microscope equipped with a 50× and 0.50 NA objective 106 (Leica N PLAN L) and a translation stage 112 (PI 542).

Emitted radiation 114 from the sample 108, comprising Raman scattered photons, together with elastically scattered photons and fluorescence photons (i.e. photoluminescence radiation) is collected by the same objective 106 and collimated towards a spectrometer 120 (Andor Shamrock 303i) equipped with a 300 lines/mm grating. A long pass filter 122 (BLP01-785) is used to block the elastically scattered light from entering the spectrometer 120. The remaining Raman scattered photons and fluorescence photons may be collectively termed scattered radiation. The spectrometer 120 is equipped with a deep-depletion back-illuminated CCD 124 (DU401 Andor), but this is not used for acquiring the Raman spectral map 101. By switching a mirror 126 in the spectrometer 120, it is possible to direct the dispersed Raman and fluorescence light via a side port onto a digital micromirror device, DMD, 128 (Texas Instruments DLP3000 digital micromirror device). Lenses L1 and L2 relay the image plane from the spectrometer output port onto the DMD. As each spatial element of the DMD corresponds to a specific wavelength, or narrow band of wavelengths, the DMD can be used for high-resolution spectral filtering. Thus, an effective spectral filter 130 is formed by the combination of the spectrometer 120 and DMD 128 and is tunable by turning on and off elements of the DMD 128. The elements of the DMD 128 are set in such a manner as to select one or more particular wavelengths of the Raman scattered radiation 114 corresponding to one or more characteristic Raman spectral features of a material species on the sample 108, thereby obtaining a filtered portion 132 of the Raman scattered radiation and fluorescence radiation. In general, the spectral filter 130 could consist of any dispersive element and means for selecting particular portions of the dispersed spectrum. For example, a spatial light modulator (SLM) used in conjunction with one or more diffraction gratings or prisms. The SLM could be a DMD as described above or a liquid crystal SLM, or a bespoke mask layer which selects particular portions of the dispersed spectrum. An advantage of using a DMD or SLM is that different portions of the spectrum can be quickly and easily changed to adapt the apparatus for detecting different material species.

The filtered portion 132 corresponding to the selected wavelengths is collimated by a collimating lens L3 and spatially recombined via two equilateral prisms P1 and P2, then focused by a focusing lens L4 onto a detector 134, which in the example shown is in the form of a 50 µm×50

µm area single photon avalanche diode, SPAD (MPD 50CT SPAD). The prisms P1 and P2 were selected to obtain the desired amount of dispersion and lens L3 selected to match the dispersion angles from the spectrometer 120 to the dispersion of the prisms P1 and P2, such that the entire selected wavelength range of the filtered portion 132 could be recombined to form a collimated polychromatic beam 136. The prisms P1 and P2 together form recombination optics 150 arranged to spatially recombine different wavelengths of the filtered portion 132 of the scattered radiation before coupling into the detector 134. It should be appreciated that other arrangements could be employed such as a pair of diffraction gratings or a grating and a prism, for example. Further, the recombination optics 150 are not an essential component of the apparatus 100 because the detector 134 may in some cases be large enough to directly collect the filtered portion 132.

The detector 134 produces electrical pulses 138 (e.g. TTL pulses) in response to the incident radiation, i.e. filtered portion 132. The arrival of each electrical pulse 138 from the SPAD 134 is compared with the Katana laser sync pulse 140 via a time to digital convertor (TDC) 142 with 10 ps temporal resolution (TDC GPX2 by ams). A microcontroller (not shown) handles the configuration of the TDC and the data acquisition via SPI communication, which then sends the photon detection data in binary serial format to a personal computer (PC) 144. Matlab (Mathworks R2017b) was used for instrument control and data analysis and specifically to apply a time gate in order to distinguish detection events corresponding to Raman scattered radiation 114 associated with the first material species from detection events associated with photoluminescence 118. The combination of the TDC 142 and PC 144 form readout electronics 146 arranged to apply the time gate. However, other configurations are contemplated as falling within the scope of the invention, e.g. bespoke electronics, FPGAs and the like. It should also be appreciated that, since the time of arrival of all detected photons is, or can be, recorded, it is possible to additionally make use of the information conveyed by the fluorescence photons by selecting an appropriate time gate.

Whilst the embodiment described with reference to FIG. 1 uses a single detector, in alternative embodiments two or more separate detectors may receive different filtered portions of the radiation scattered from the sample. The DMD or SLM can be configured to send different wavelengths in different directions, thereby enabling a first detector to receive a first filtered portion of the scattered radiation and to provide first output electrical pulses indicative thereof and a second detector to receive a second filtered portion of the scattered radiation and to provide second output electrical pulses indicative thereof. The first filtered portion of the scattered radiation could, for example, correspond to one or more characteristic Raman spectral features of a first material species of the sample (e.g. Tylenol), and a second filtered portion of the scattered radiation could, for example, correspond to one or more characteristic Raman spectral features of a second material species of the sample (e.g. Stilbene) which is distinct from the first material species. Provided the first and second filtered portions are separable, e.g. have different polarizations or spatial modes, then they can be sent to different detectors such that Raman data can be acquired for multiple material species at the same time—reducing the overall time required to acquire a multi-species, time-gated Raman spectral map.

The performance of the apparatus 100 was tested by comparing the spectra of standard non-fluorescing materials used in Raman spectroscopy (e.g. polystyrene, paracetamol/acetaminophen) acquired using the conventional Raman set up based on the CCD 124 with the spectra 148 of the same samples acquired by scanning the DMD 128 elements sequentially (referred to herein as "scanning"). The scanning spectra 148 were acquired over a spectral range of 650-1650 $cm^{-1}$ and resolution of 10 $cm^{-1}$, roughly equivalent to the CCD. Only minor differences were observed related to the relative intensity of the bands, attributable to differences in the wavelength-dependence of the optical components and detection efficiency of the SPAD 134 and CCD 124.

Figure 2:
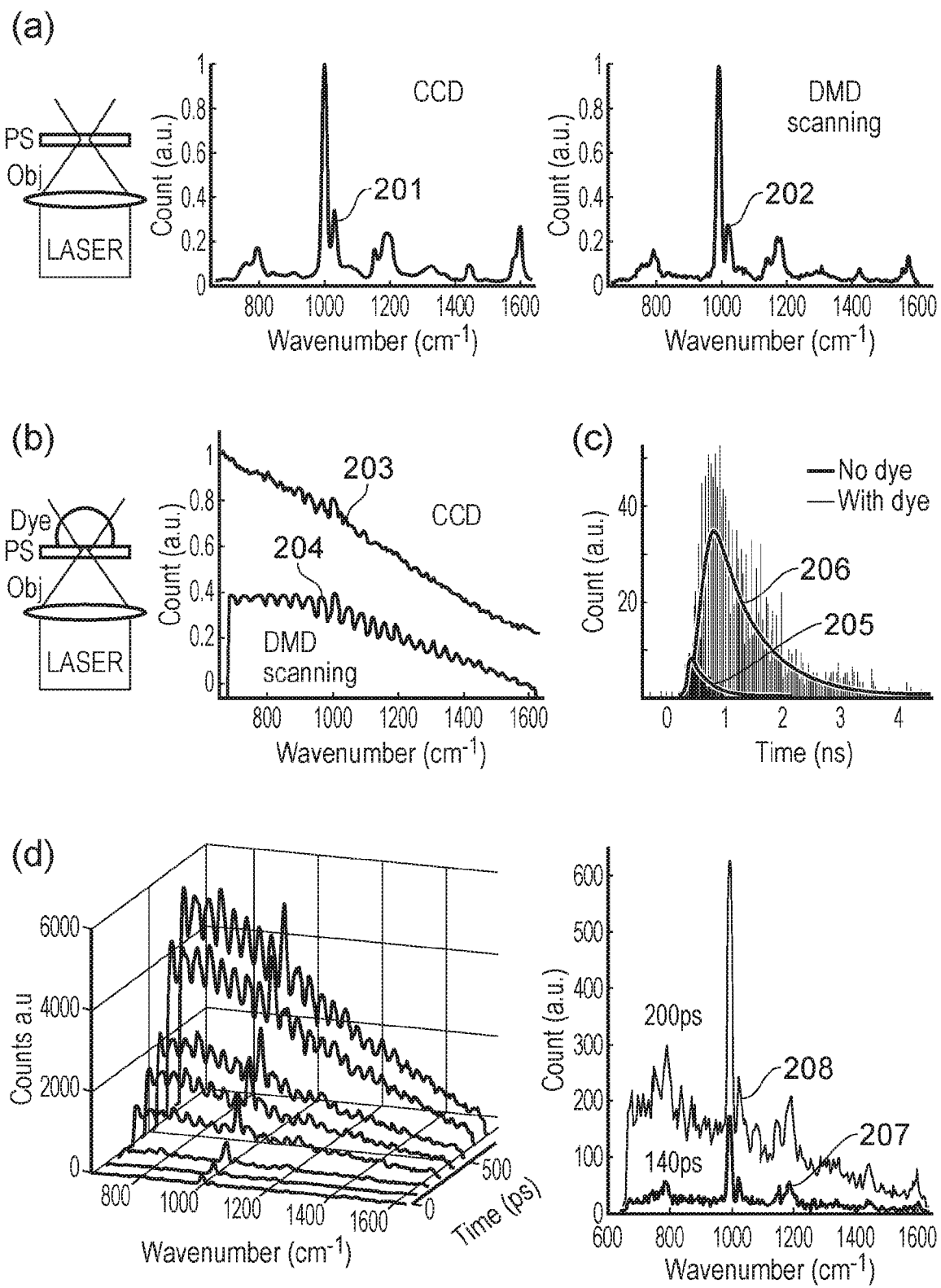
FIG. 2 shows a comparison between time-gated Raman spectra acquired with an apparatus according to the present disclosure and Raman spectra acquired with a conventional CCD without time gating.

FIG. 2 shows that all main bands measured in the conventional Raman spectrum of polystyrene (PS) acquired with the CCD can be identified in the spectrum measured in the scanning mode. Specifically, FIG. 2(*a*) shows a comparison between the Raman spectra of a polystyrene (PS) sample acquired with a conventional CCD (spectrum 201) with that obtained using the apparatus 100 shown in FIG. 1 (spectrum 202) operating in scanning mode without time-gating (all time-components integrated). To evaluate the ability of the apparatus 100 to discriminate between Raman 114 and fluorescence photons 118 (i.e. fluorescence rejection), the experiments were repeated after adding a highly fluorescing dye (Sigma Aldrich Fluorescent Red 730 (lifetime ~1 ns)) solution on top of the polystyrene sample. FIG. 2(*b*) shows that the Raman bands of polystyrene are swamped by the broad fluorescence background, both for the spectrum 203 acquired with the CCD and the spectrum 204 acquired in the scanning mode without time-gating. The main band of the PS at 1004 $cm^{-1}$ corresponding to the ring breathing mode can hardly be distinguished. With this large background, baseline subtraction techniques cannot recover the Raman bands, which remain buried in the shot-noise and etaloning fringes from the detection system accentuated by the strong fluorescence background. Nevertheless, the histograms 205, 206 of the timing of photon detection events shown in FIG. 2(*c*), histogram 205 showing the response without dye and histogram 206 with dye, show that the Raman bands could be recovered effectively by time-gating the detection. The time-gated Raman spectra of the PS/dye sample are presented in FIG. 2(*d*) and show that, for time gates shorter than 200 ps, the Raman bands of the PS can be observed clearly. In fact, the Raman bands in the spectra 207, 208 acquired at 140 ps and 200 ps respectively are similar to the spectra 201, 202 acquired for pure PS shown in FIG. 2*a*, i.e. without the fluorescent dye.

Advantages of the present invention become more evident when operating the apparatus 100 in what is termed herein "spectral multiplexing" mode, which allows simultaneous detection of the Raman photons 114 corresponding to selected Raman bands of interest, with high-spectral resolution filtering (10 $cm^{-1}$ in this example) and high efficiency rejection of the fluorescence photons 118. The acquisition of a higher number of Raman photons, at a high repetition rate offered by the laser (10 MHz), leads to significantly shorter integration times, and makes time-gated Raman spectral mapping more practical. In a general aspect therefore, the repetition rate of the pulsed illumination may be 10 MHz of greater, and the filtered portion of the emitted radiation may have a resolution of 10 $cm^{-1}$ or less, enabling a spectral map of a sample having 10,000 pixels or more to be generated in a short time, for example less than 1 minute or less than 10 seconds.

Figure 3:
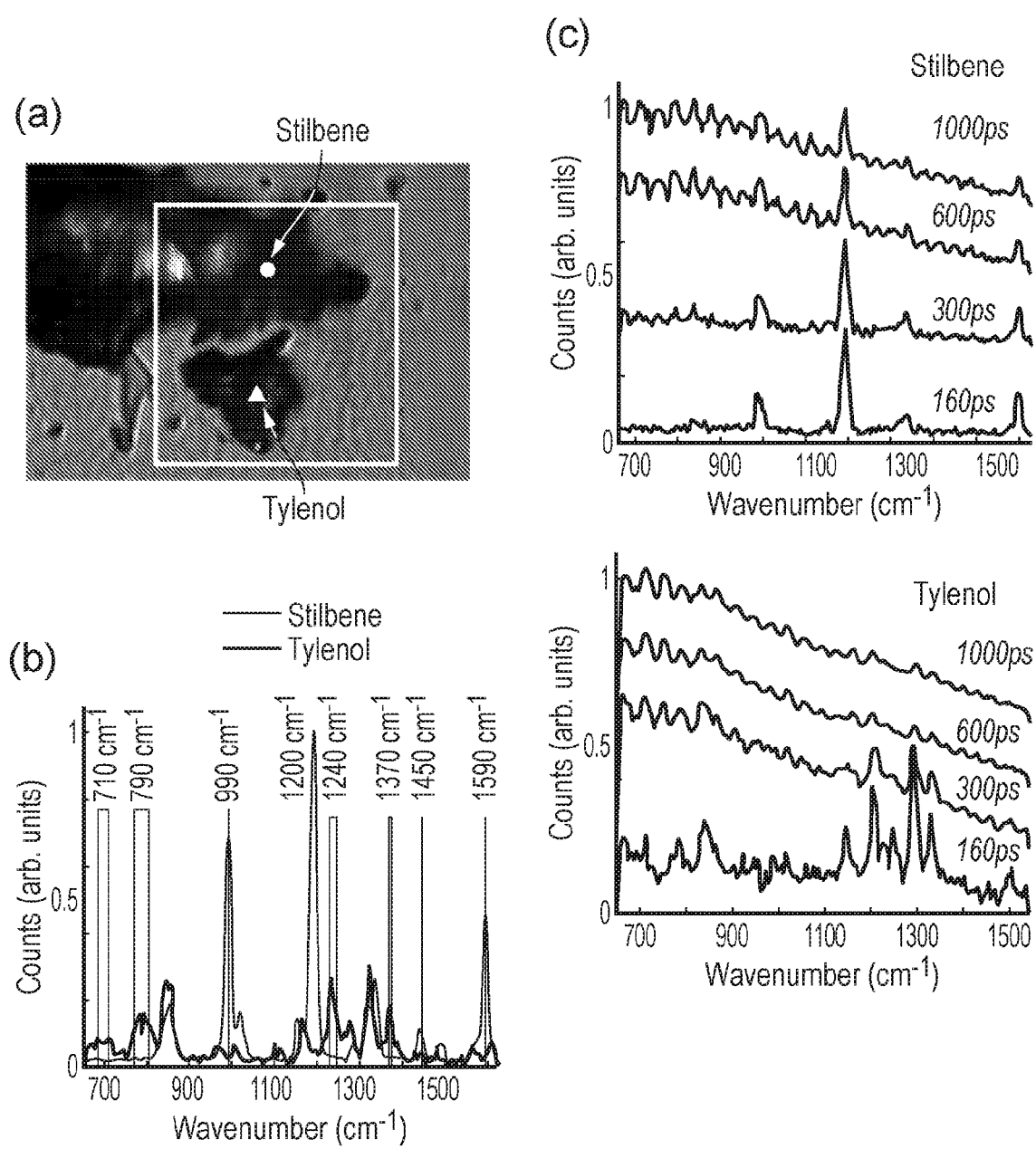
FIG. 3 shows time-gated Raman spectra acquired with an apparatus according to the present disclosure.

To demonstrate these advantages, a sample 108 was selected consisting of two different material species, specifically trans-stilbene and Tylenol (acetaminophen) powder on a glass coverslip, covered by a small amount of fluorescent dye solution. A bright-field image of the Tylenol and stilbene powder mixture on the glass coverslip (mapping area 120 μm×120 μm) is shown in FIG. 3(a). Stilbene and Tylenol are common samples used in Raman spectroscopy because they elicit sharp Raman bands and no fluorescence background. The time-gated Raman spectra of paracetamol and stilbene measured in the scanning mode before adding the fluorescence was used to identify the Raman bands that provide the highest spectral discrimination between the two materials, shown in FIG. 3b. The spectral features were then carefully chosen to maximize the Raman signal whilst minimizing the spectral overlap between bands for the two materials. In the example presented here, the bands unique to paracetamol were selected at 710, 790, 1240 and 1370 $cm^{-1}$, while the bands unique to stilbene were the 990, 1200, 1450 and 1590 $cm^{-1}$. After adding the fluorescent dye, time-gated Raman spectra were collected at the same locations, as shown in FIG. 3(c) top and bottom for stilbene and Tylenol respectively. The results show that the Tylenol bands can be efficiently recovered for time-gates as long as 160 ps, but they become covered by the increasing fluorescence background at time-gates longer than 300 ps. Similar increase in the fluorescence background with the duration of the time-gate is observed for stilbene; however, stilbene molecules have higher Raman scattering cross-section, therefore the Raman bands can be identified even for time-gates as long as 600-1000 ps.

The Raman bands, which are selected to form the filtered portion 132 of the radiation scattered from the sample, thus correspond to one or more characteristic Raman spectral features of the first material species (e.g. Tylenol) and the second material species (e.g. stilbene). In addition, it should be noted that the selected band has a certain bandwidth which is also tunable, for each selected central wavenumber, by the spectral filter 130. For example, in FIG. 3(b) the bandwidth of the 710 $cm^{-1}$ line is less than the bandwidth of the 790 $cm^{-1}$ line for Tylenol and the spectral filter 130 is tuned accordingly. In general, the spectral filter may be arranged to cover at least the full width half maximum, FWHM, of a Raman peak of the particular material species.

Figure 4:
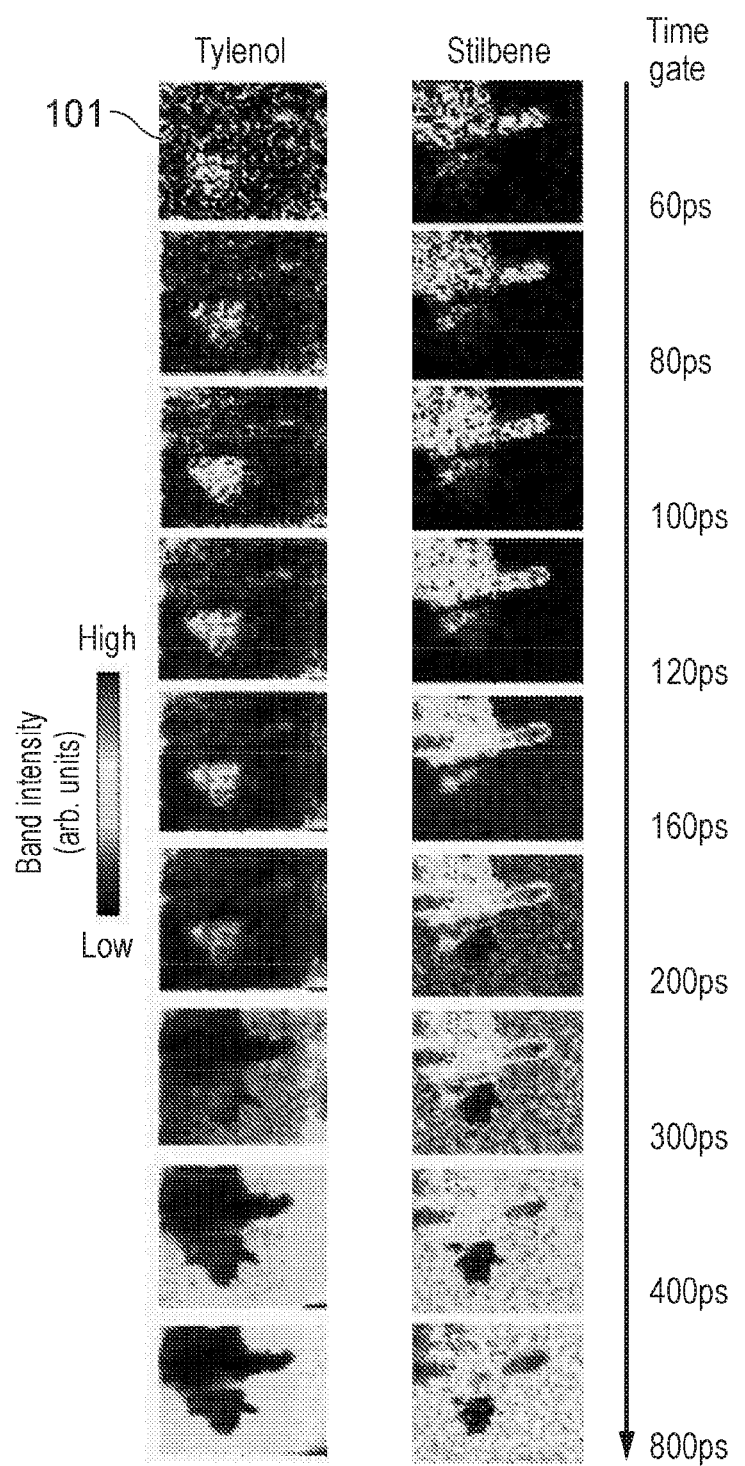
FIG. 4 shows time-gated Raman spectral maps obtained from measurements made with an apparatus according to the present disclosure.

After identification of the specific bands for Tylenol and stilbene, time-gated Raman maps were acquired by raster scanning the sample through the laser focus over an area of 120 μm×120 μm with a 3 μm step size, corresponding to an array of 40×40 pixels, the results of which are shown in FIG. 4. To obtain the time-gated Raman maps of Tylenol, the DMD elements corresponding to the 710, 790, 1240 and 1370 cm−1 were selected to reflect the Raman photons towards the SPAD, while all other DMD elements were switched to reflect the light corresponding to all other wavelengths towards a beam block. For the Raman maps highlighting the areas of stilbene, only the DMD elements corresponding to the 990, 1200, 1450 and 1590 $cm^{-1}$ were turned towards the SPAD. This spectral multiplexing allowed the acquisition of the time-gated Raman signals with integration times of 1 s per pixel for Tylenol and 0.1 s per pixel for stilbene. The total measurement times for the 40×40 pixel resolution images were 27 minutes for Tylenol and 3 minutes for stilbene (total scan time for both materials of approximately 30 minutes). To obtain the time-gated Raman maps, the raw data from the scans was separated into 20 ps bins and the resulting images are shown in FIG. 4 (no further processing applied). The gate width that provides the greatest signal-to-noise ratio depends on the optical properties of the sample, the Raman intensity and the lifetime and intensity of the fluorescence. As such, the optimum gate width varies from sample to sample. All photon detection events are recorded with their respective time of detection tagged and the ideal time gate can be determined after measurement by inspection.

The time-gated Raman spectral maps show that the two materials, Tylenol and stilbene, can be distinctly identified up to time-gates of 200 ps. Beyond this time, the stilbene signal increases but the Raman photons generated by Tylenol become buried in the fluorescence background. The Tylenol images show the highest greatest signal to noise ratio at a gate width of 120 ps, stilbene sample displays optimum contrast at 160 ps. For long time-gate values (e.g. 800 ps), the Raman photons are swamped by the fluorescence photons, and the Tylenol and stilbene particles can no longer be discriminated (they appear as regions of low signal as they block part of the fluorescence photons emitted by the dye molecules).

Figure 5:
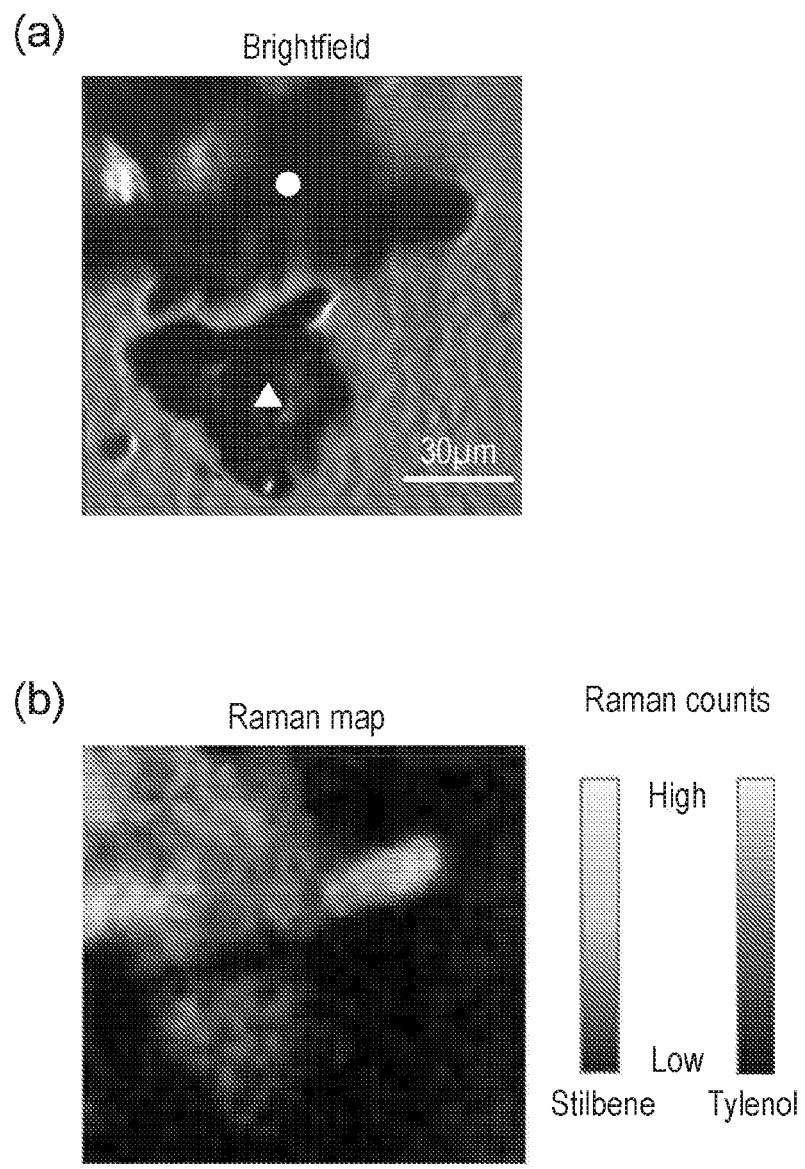
FIG. 5 shows a time-gated Raman spectral map of a sample comprising two material species obtained from measurements made with an apparatus according to the present disclosure.

FIG. 5 shows a combined Raman map (b) of the Tylenol and stilbene samples (time-gate was 120 ps for Tylenol, and 160 ps for stilbene, total time: 30 minutes) compared to a bright-field image of the same sample (a).

Figure 6:
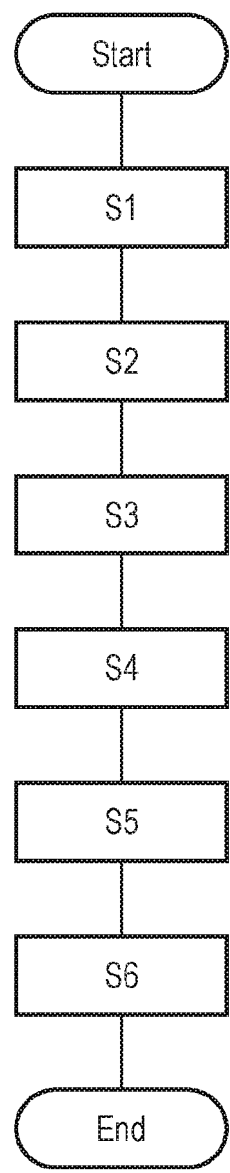
FIG. 6 is a flow chart corresponding to a method according to the present disclosure.
Figure 7A:
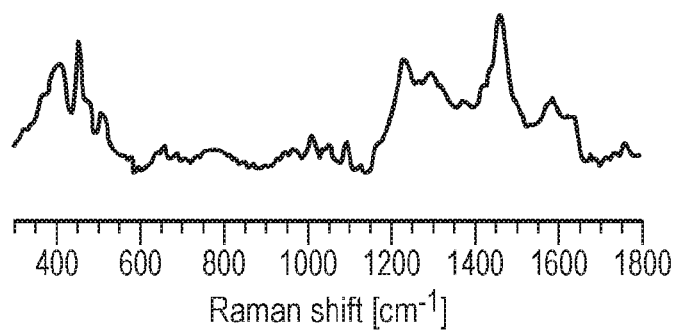
FIGS. 7a to 7d are various spectra acquired from a lac dye/red lake pigment.
Figure 7B:
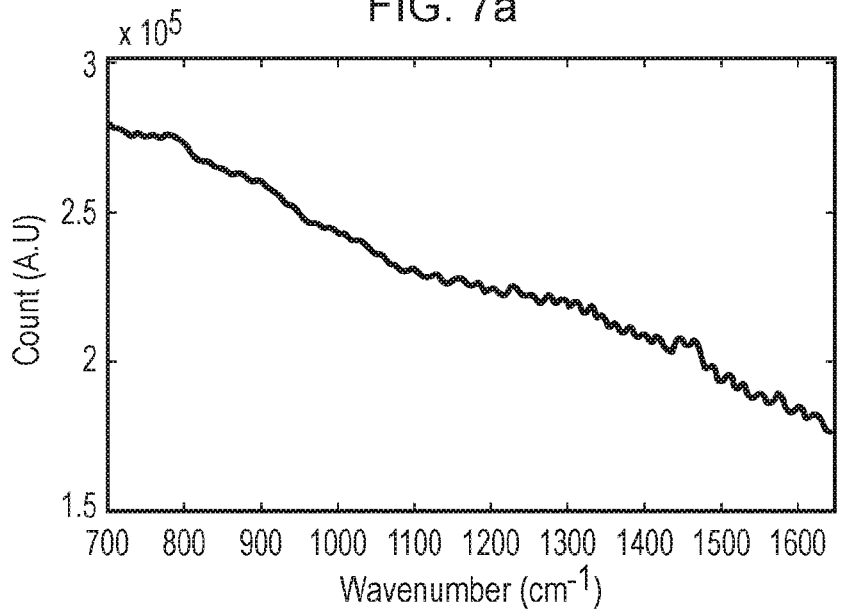
Figure 7C:
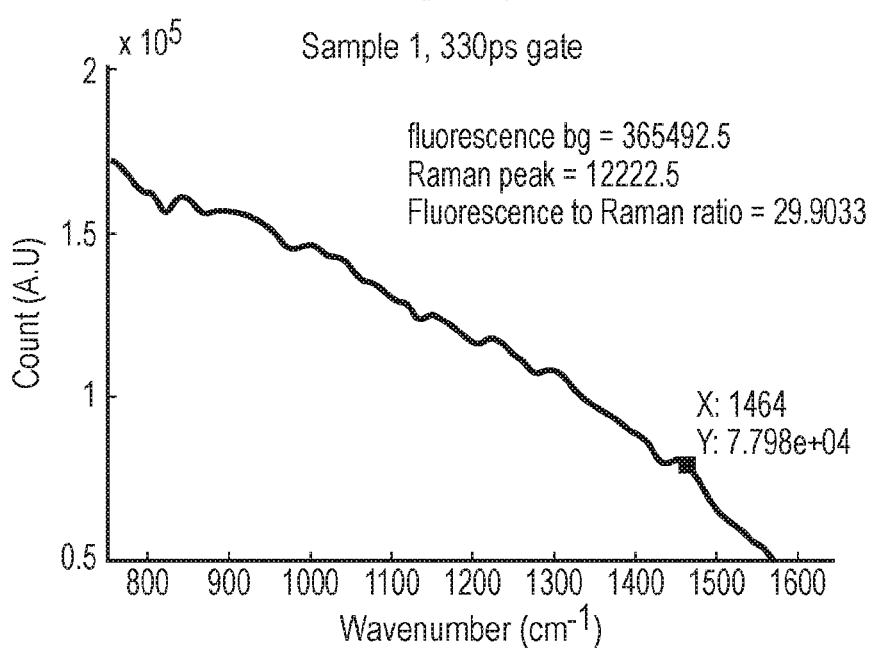
Figure 7D:
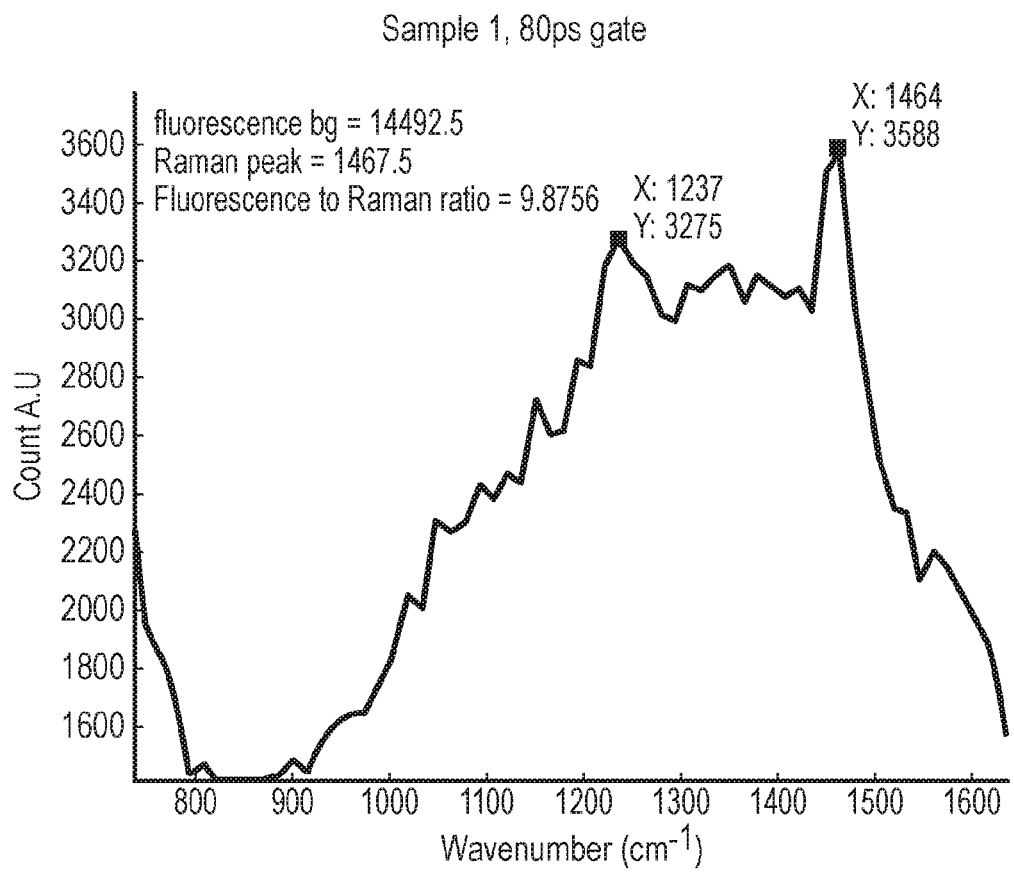

FIG. 6 is a flowchart corresponding to a method of acquiring a Raman spectral map of a sample comprising a material species according to an embodiment of the invention. The Raman spectral map consists of an array of data points corresponding to respective regions of the sample, as explained above. The method comprises the steps of:
  producing (S1) pulsed illumination radiation for exciting the sample and producing scattered radiation;
  focusing (S2) the pulsed illumination radiation onto a region of the sample corresponding to a data point of the Raman spectral map, and collecting emitted radiation from said region;
  spectrally filtering (S3) the collected emitted radiation to obtain a filtered portion of the emitted radiation corresponding to one or more characteristic Raman spectral features of the material species;
  detecting (S4) the filtered portion of the emitted radiation to provide output electrical pulses indicative thereof;
  time gating (S5) the output electrical pulses to distinguish detection events corresponding to Raman scattered radiation associated with the material species from detection events associated with photoluminescence; and
  repeating (S6) the above steps S1 to S5 for each region of the sample corresponding to a data point of the Raman spectral map.

Figure 8A:
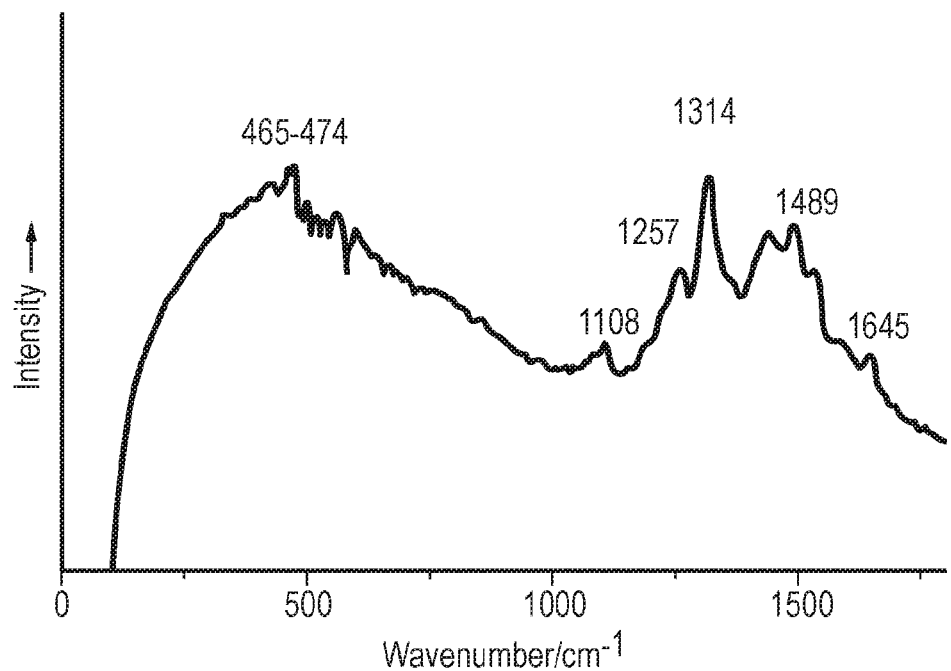
FIGS. 8a to 8d are various spectra acquired from a carmine naccarat pigment.
Figure 8B:
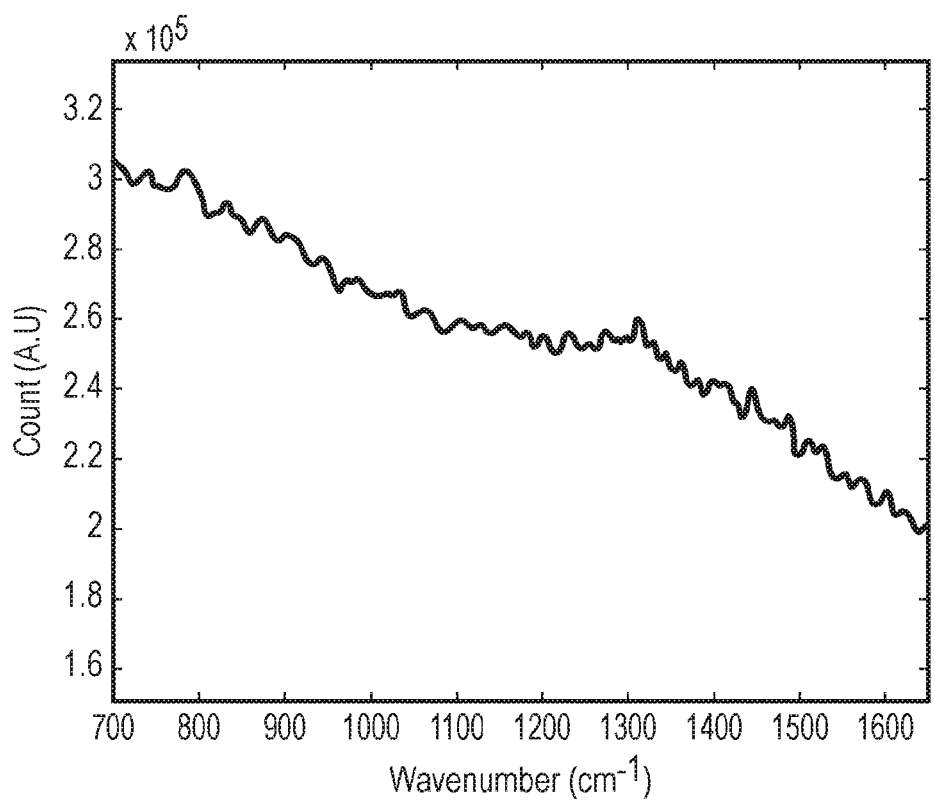
Figure 8C:
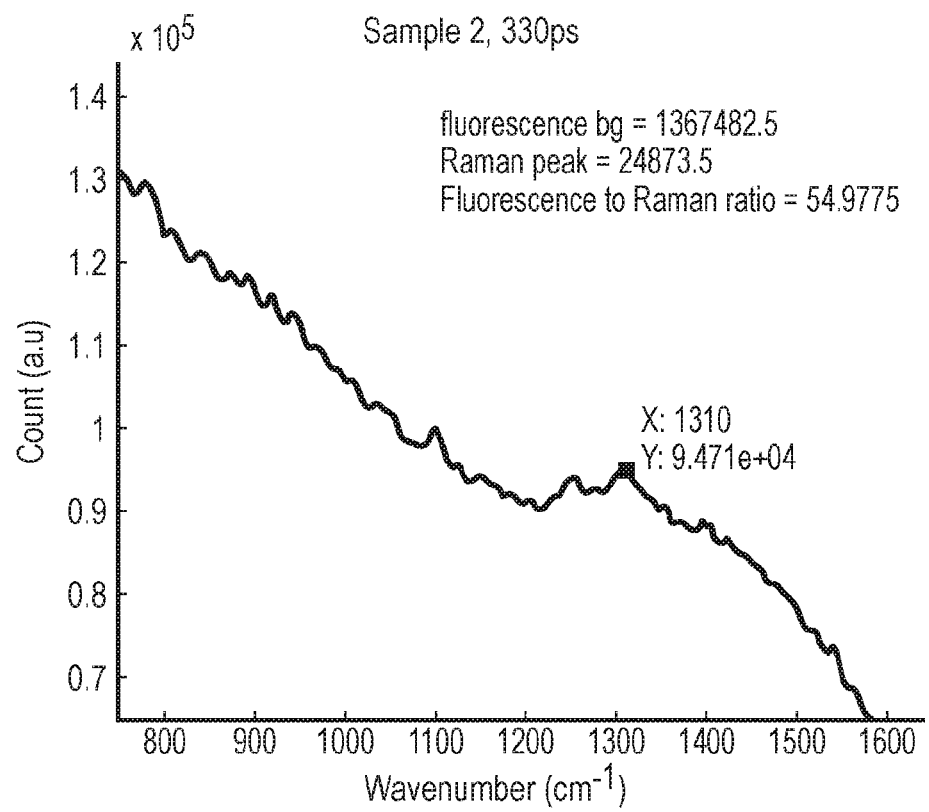
Figure 8D:
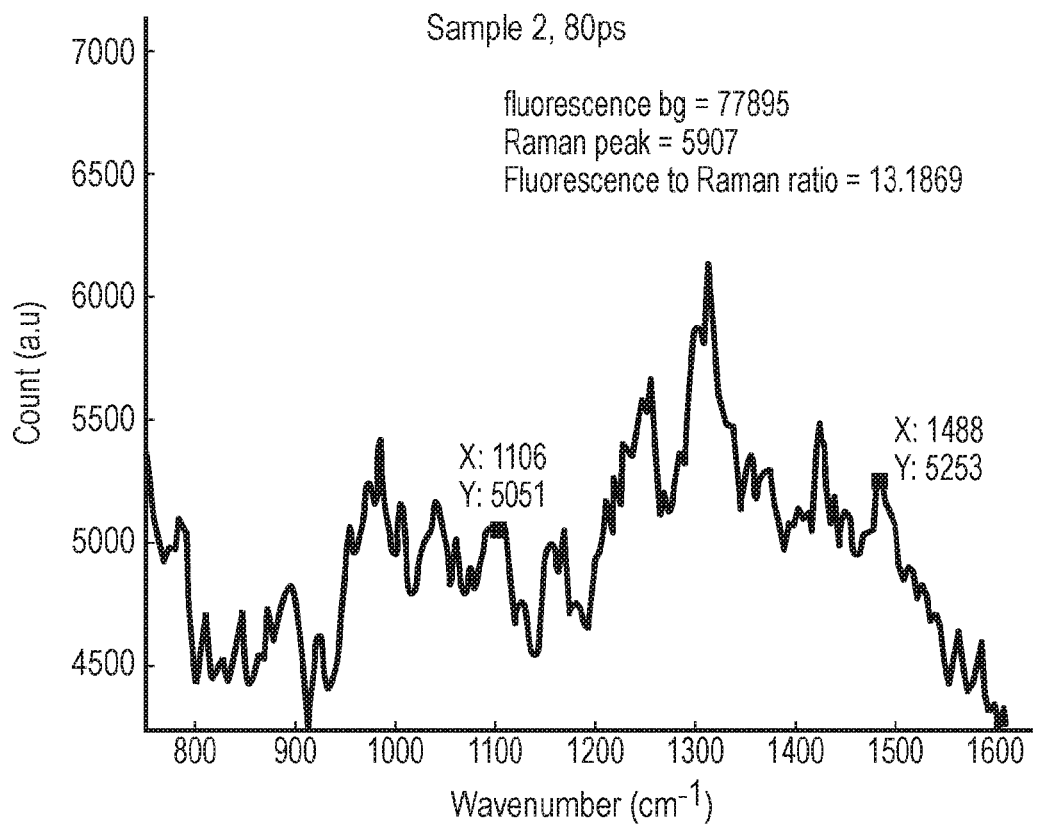
Figure 9A:
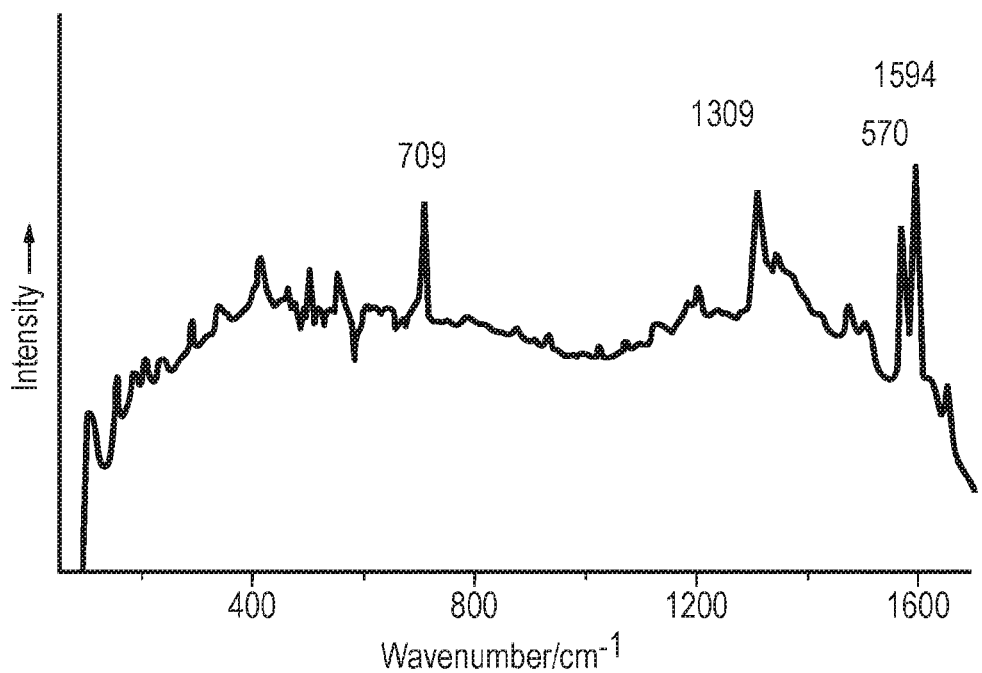
FIGS. 9a to 9c are various spectra acquired from a quinacridone red magenta pigment.
Figure 9B:
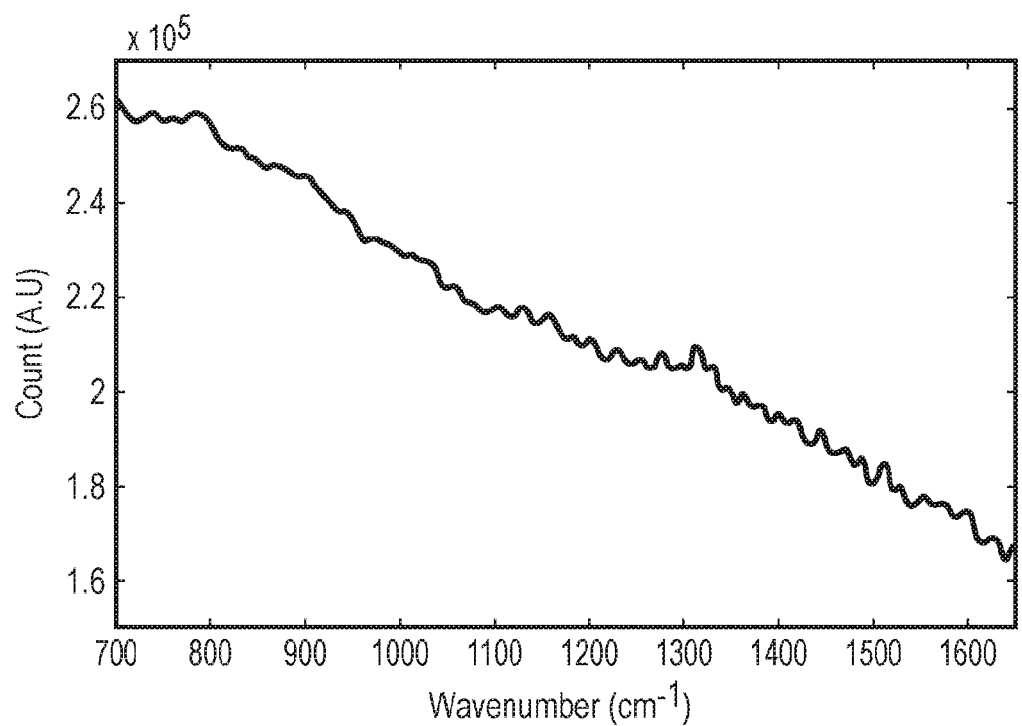
Figure 9C:
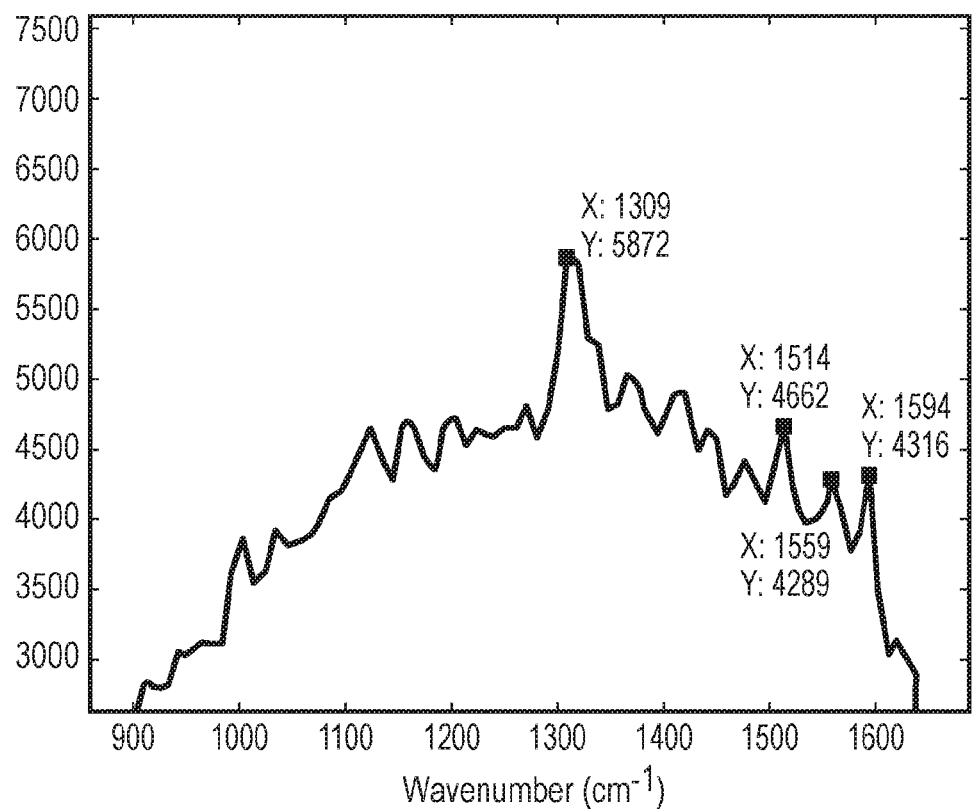

FIGS. 7 to 11, described below, illustrate the benefit of using time-gated Raman spectra for obtaining results from materials that have inherently high fluorescence. FIGS. 7, 8 and 9 show results for three different red pigments, each of which has Raman bands that are fully covered by a fluorescence background.

FIG. 7 shows results from a red lake/lac dye pigment (Zecchi 0207). FIG. 7a is a reference spectrum obtained using conventional FT Raman spectroscopy. FIG. 7b is an ungated Raman spectrum acquired using an Andor CCD from 775 nm excitation. The fluorescence response from the sample entirely covers all Raman bands. FIG. 7c is a further spectrum taken using a 330 ps gate width. Fluorescence still covers the Raman bands, but the 1464 $cm^{-1}$ peak is just detectable. FIG. 7d is a further spectrum taken using an 80 ps gate width, which succeeds in removing the fluorescence background such that the 1464 and 1237 $cm^{-1}$ bands are clearly detectable.

FIG. 8 shows a similar series of results for a carmine naccarat pigment (Kremer 42100), with FIG. 8a a reference FT Raman spectrum, FIG. 8b an ungated spectrum acquired with 775 nm excitation, FIG. 8c a spectrum acquired with a 330 ps gate width and FIG. 8d a spectrum acquired with a gate width of 80 ps, in which all major Raman bands are detectable.

FIG. 9 shows a similar series of results for a quinacridone red magenta pigment (Kremer 23720), with FIG. 9a a reference FT Raman spectrum, FIG. 8b an ungated spectrum acquired with 775 nm excitation, and FIG. 8c an 80 ps gated spectrum in which the main Raman bands are detectable.

FIGS. 7 to 9 therefore show that the technique described herein of gated Raman spectroscopy in combination with spatial spectral filtering, with gate times of 100 ps or less, may be used for distinguishing between highly fluorescing materials such as pigments. The technique may for example be used to map the distribution of pigments in a mixed sample or object. In a general aspect therefore, the sample comprising a material species may comprise a mixture of pigments, and the method may result in a spectral map of the sample in which a colour of each pixel in the spectral map corresponds to a detected pigment in the sample.

Figure 10:
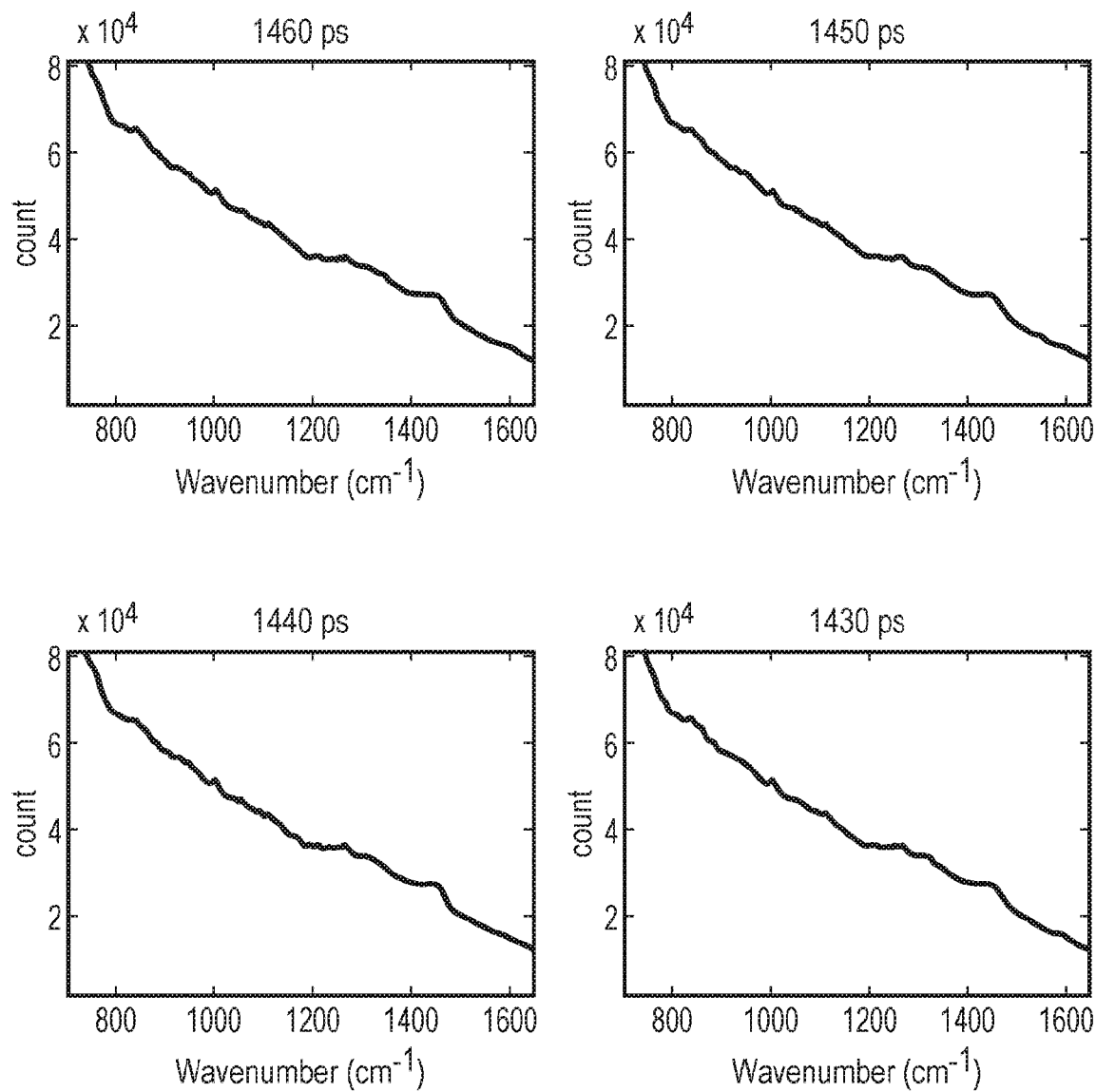
FIG. 10 shows Raman spectra taken from liver tissue with a high fluorescence background for long gated times.
Figure 11:
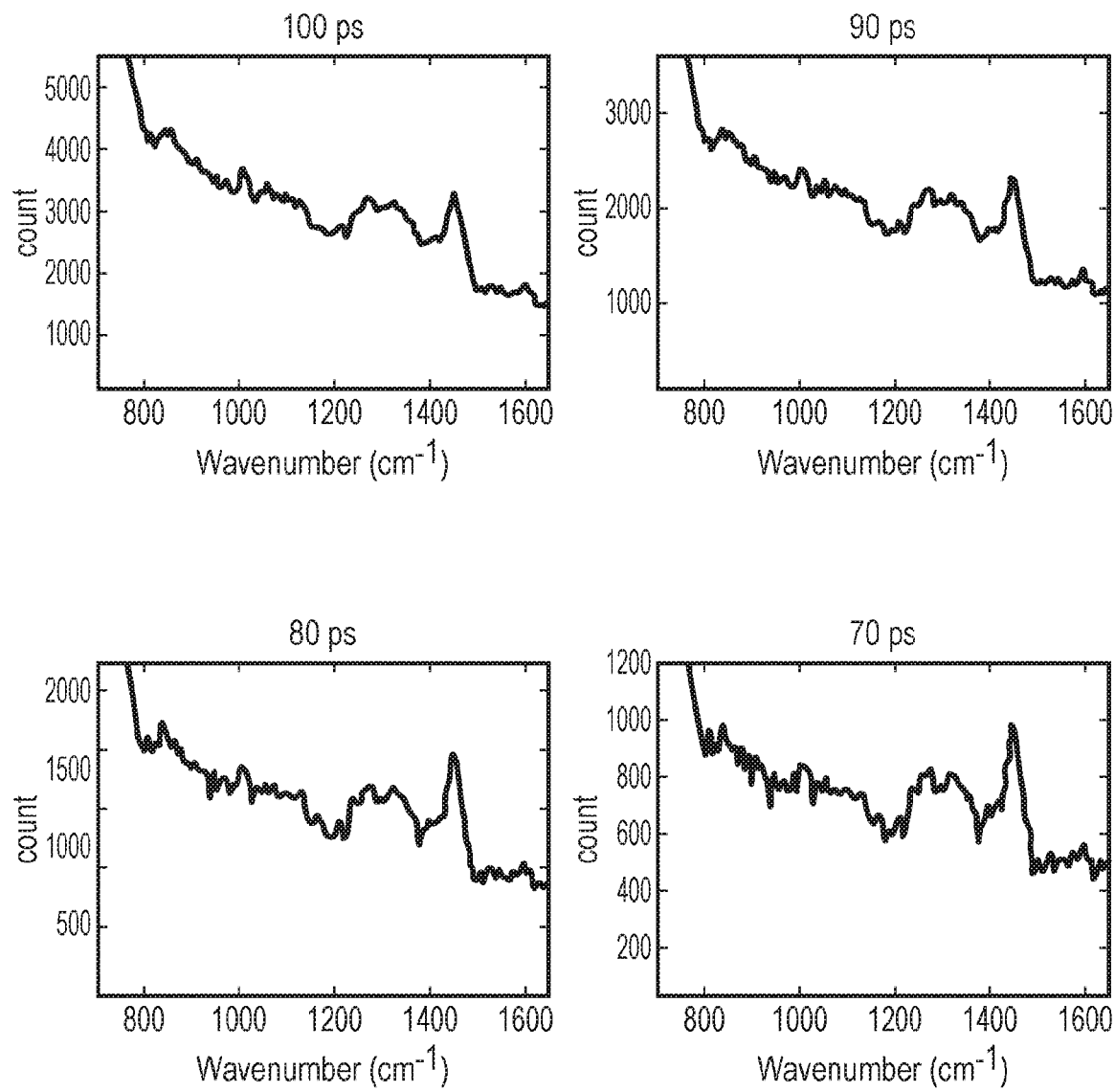
FIG. 11 shows Raman spectra taken from liver tissue with a high fluorescence background for short gated times.

FIGS. 10 and 11 illustrate the use of the technique in measuring Raman spectra of tissue having a high fluorescence background, in this case liver tissue. FIG. 10 shows four example spectra obtained using long gate widths of between 1430 and 1460 ps, in which some Raman bands are indicated but are largely covered by the fluorescence background. FIG. 11 show results at shorter gate widths of between 70 and 100 ps, in which the Raman bands are clearly shown, in particular CH3 deformation (1450 cm$^{-1}$), amide III (1200-1400 cm$^{-1}$) and phenylalanine (1000 cm$^{-1}$). These results demonstrate the ability of the technique of time-gated Raman in combination with spatial spectral filtering to measure highly fluorescing tissue samples, making the technique suitable for diagnostic purposes. In a general aspect therefore, the sample comprising a material species may be a tissue sample, and the method may result in a spectral map of the sample in which a colour of each pixel in the spectral map correspond to a detected type of tissue in the sample.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An apparatus for acquiring a Raman spectral map of a sample comprising a material species, the Raman spectral map comprising an array of data points corresponding to respective regions of the sample, the apparatus comprising:
a pulsed illumination source arranged to provide pulsed illumination radiation for exciting the sample and producing scattered radiation;
a microscope objective arranged to focus the pulsed illumination radiation onto a region of the sample corresponding to a data point of the Raman spectral map, and further arranged to collect radiation emitted from said region;
a translation stage arranged to translate the sample relative to the microscope objective in at least two directions;
a spectral filter arranged to spectrally filter the emitted radiation collected by the microscope objective to obtain a filtered portion of the emitted radiation corresponding to one or more characteristic Raman spectral features of the material species, wherein the spectral filter comprises a dispersive element and a spatial light modulator (SLM);
a detector arranged to receive said filtered portion of the emitted radiation and to provide output electrical pulses indicative thereof; and
readout electronics connected to the detector and configured to apply a time gate to said output electrical pulses to distinguish detection events corresponding to Raman scattered radiation associated with the material species from detection events associated with photoluminescence.

2. The apparatus according to claim 1, wherein the filtered portion of the emitted radiation corresponds to two or more characteristic Raman peaks of the material species.

3. The apparatus according to claim 1, wherein the filtered portion covers at least the full width half maximum (FWHM) of a Raman peak of the material species.

4. The apparatus according to claim 1, wherein the SLM comprises a digital micromirror device (DMD).

5. The apparatus according to claim 1, wherein the SLM comprises a liquid crystal SLM.

6. The apparatus according to claim 1, wherein the dispersive element comprises a diffraction grating.

7. The apparatus according to claim 1, further comprising recombination optics arranged to spatially recombine different wavelengths of the filtered portion of the emitted radiation before coupling into the detector.

8. The apparatus according to claim 7, wherein the recombination optics comprise a pair of prisms.

9. The apparatus according to claim 1, further comprising a long pass optical filter in a path of the emitted radiation between the microscope objective and the spectral filter.

10. The apparatus according to claim 1, wherein the detector comprises a single-pixel detector.

11. The apparatus according to claim 1, wherein the detector comprises a single-photon avalanche diode (SPAD).

12. The apparatus according to claim 1, wherein the pulsed illumination source comprises a pulsed laser arranged to produce pulses with a wavelength in the range 500 nm to 1000 nm, a pulse duration in the range 1 ps to 100 ps, a pulse energy in the range 1 nJ to 20 nJ, and a repetition rate in the range 1 MHz to 100 MHz.

13. The apparatus according to claim 1, wherein the readout electronics comprise a time to digital converter configured to compare the arrival time of the output electrical pulses with a synchronization pulse derived from the pulsed illumination source.

14. The apparatus according to claim 1, further comprising a computer connected to the readout electronics and to the translation stage, the computer comprising a non-volatile memory storing a program containing instructions arranged to control the apparatus to acquire a Raman spectral map.

15. The apparatus according to claim 1, wherein:
the spectral filter is arranged to spectrally filter the emitted radiation collected by the microscope objective to obtain a first filtered portion of the emitted radiation corresponding to one or more characteristic Raman spectral features of a first material species of the sample, and a second filtered portion of the emitted radiation corresponding to one or more characteristic Raman spectral features of a second material species of the sample which is distinct from the first material species, the first and second filtered portions having different polarizations or spatial modes;

a first detector is arranged to receive the first filtered portion of the emitted radiation and to provide first output electrical pulses indicative thereof and a second detector is arranged to receive the second filtered portion of the emitted radiation and to provide second output electrical pulses indicative thereof; and the readout electronics are connected to the first and second detectors and are configured to apply time gates to said first and second output electrical pulses to distinguish detection events corresponding to Raman scattered radiation associated with the first and second material species respectively from detection events associated with photoluminescence.

16. A method of acquiring a Raman spectral map of a sample comprising a material species, the Raman spectral map comprising an array of data points corresponding to respective regions of the sample, the method comprising steps of:

producing pulsed illumination radiation for exciting the sample and producing scattered radiation;

focussing the pulsed illumination radiation onto a region of the sample corresponding to a data point of the Raman spectral map, and collecting radiation emitted from said region;

spectrally filtering the collected emitted radiation to obtain a filtered portion of the emitted radiation corresponding to one or more characteristic Raman spectral features of the material species;

detecting the filtered portion of the emitted radiation to provide output electrical pulses indicative thereof;

time gating the output electrical pulses to distinguish detection events corresponding to Raman scattered radiation associated with the material species from detection events associated with photoluminescence; and repeating the above steps for each region of the sample corresponding to a data point of the Raman spectral map.

17. The method according to claim 16, wherein the filtered portion of the emitted radiation corresponds to two or more characteristic Raman peaks of the material species.

18. The method according to claim 16, wherein the filtered portion of the emitted radiation covers at least the full width half maximum (FWHM) of a Raman peak of the material species.

19. The method according to claim 16, wherein the step of spectrally filtering comprises spatially separating different wavelengths of the collected emitted radiation using a dispersive element and selecting one or more wavelengths using a spatial light modulator (SLM).

20. The method according to claim 16, further comprising spatially recombining different wavelengths of the filtered portion before detecting the filtered portion.

21. The method according to claim 16, further comprising applying a long pass optical filter to the emitted radiation before said step of spectrally filtering.

22. The method according to claim 16, wherein the step of time gating comprises comparing the arrival time of the output electrical pulses with a synchronization pulse corresponding to the pulsed illumination radiation.

23. The method according to claim 16, wherein the step of detecting is performed with a single-pixel detector.

24. The method according to claim 23, wherein the single pixel detector is a single photon-avalanche diode (SPAD).

25. The method according to claim 16, wherein:
the step of spectrally filtering the scatted radiation comprises obtaining a first filtered portion of the emitted radiation corresponding to one or more characteristic Raman spectral features of a first material species of the sample and a second filtered portion of the emitted radiation corresponding to one or more characteristic Raman spectral features of a second material species of the sample which is distinct from the first material species, the first and second filtered portions having different polarizations or spatial modes;

separately detecting the first and second filtered portions of the emitted radiation to provide output electrical pulses indicative thereof; and time gating the output electrical pulses to distinguish detection events corresponding to Raman scattered radiation associated with the first and second material species from detection events associated with photoluminescence.

26. An apparatus for acquiring a Raman spectral map of a sample comprising a material species, the Raman spectral map comprising an array of data points corresponding to respective regions of the sample, the apparatus comprising:

a pulsed illumination source arranged to provide pulsed illumination radiation for exciting the sample and producing scattered radiation;

a microscope objective arranged to focus the pulsed illumination radiation onto a region of the sample corresponding to a data point of the Raman spectral map, and further arranged to collect radiation emitted from said region;

a translation stage arranged to translate the sample relative to the microscope objective in at least two directions;

a spectral filter arranged to spectrally filter the emitted radiation collected by the microscope objective to obtain a filtered portion of the emitted radiation corresponding to one or more characteristic Raman spectral features of the material species;

a detector arranged to receive said filtered portion of the emitted radiation and to provide output electrical pulses indicative thereof;

readout electronics connected to the detector and configured to apply a time gate to said output electrical pulses to distinguish detection events corresponding to Raman scattered radiation associated with the material species from detection events associated with photoluminescence; and a long pass optical filter in a path of the emitted radiation between the microscope objective and the spectral filter.

27. An apparatus for acquiring a Raman spectral map of a sample comprising a material species, the Raman spectral map comprising an array of data points corresponding to respective regions of the sample, the apparatus comprising:

a pulsed illumination source arranged to provide pulsed illumination radiation for exciting the sample and producing scattered radiation;

a microscope objective arranged to focus the pulsed illumination radiation onto a region of the sample corresponding to a data point of the Raman spectral map, and further arranged to collect radiation emitted from said region;

a translation stage arranged to translate the sample relative to the microscope objective in at least two directions;

a spectral filter arranged to spectrally filter the emitted radiation collected by the microscope objective to obtain a filtered portion of the emitted radiation corresponding to one or more characteristic Raman spectral features of the material species;

a detector arranged to receive said filtered portion of the emitted radiation and to provide output electrical pulses indicative thereof; and readout electronics connected to the detector and configured to apply a time gate to said output electrical pulses to distinguish detection events corresponding to Raman scattered radiation associated with the material species from detection events associated with photoluminescence;

wherein the pulsed illumination source comprises a pulsed laser arranged to produce pulses with a wavelength in the range 500 nm to 1000 nm, a pulse duration in the range 1 ps to 100 ps, a pulse energy in the range 1 nJ to 20 nJ, and a repetition rate in the range 1 MHz to 100 MHz.

\* \* \* \* \*